(12) United States Patent
Wen et al.

(10) Patent No.: US 9,314,772 B2
(45) Date of Patent: Apr. 19, 2016

(54) HETEROPOLY ACID SALT CATALYST AND ITS PREPARATION METHOD

(71) Applicant: Shanghai HuaYi Acrylic Acid Co. Ltd., Shanghai (CN)

(72) Inventors: Xin Wen, Shanghai (CN); Ge Luo, Shanghai (CN); Xinlei Jin, Shanghai (CN); Tonghao Wu, Shanghai (CN); Yan Zhuang, Shanghai (CN); Xiaodong Chu, Shanghai (CN); Jinghua Ji, Shanghai (CN)

(73) Assignee: Shanghai HuaYi Acrylic Acid Co. Ltd., Shanghai (CN)

( * ) Notice: Subject to any disclaimer, the term of this patent is extended or adjusted under 35 U.S.C. 154(b) by 22 days.

(21) Appl. No.: 14/086,368

(22) Filed: Nov. 21, 2013

(65) Prior Publication Data

US 2014/0141964 A1    May 22, 2014

(30) Foreign Application Priority Data

Nov. 21, 2012 (CN) .......................... 2012 1 0476506

(51) Int. Cl.
| | |
|---|---|
| B01J 23/00 | (2006.01) |
| B01J 37/03 | (2006.01) |
| B01J 27/199 | (2006.01) |
| B01J 37/00 | (2006.01) |

(52) U.S. Cl.
CPC .............. *B01J 23/002* (2013.01); *B01J 27/199* (2013.01); *B01J 37/0009* (2013.01); *B01J 37/038* (2013.01); *B01J 2523/00* (2013.01)

(58) Field of Classification Search
CPC ............ B01J 21/06; B01J 23/18; B01J 23/22; B01J 23/28; B01J 23/30; B01J 23/8435; B01J 23/8472; B01J 23/885; B01J 27/14; B01J 27/18; B01J 37/00; B01J 37/04; B01J 37/08; B01J 37/12; B01J 37/14; B01J 2208/00017; B01J 2208/00044
USPC .................................................. 502/208–211
See application file for complete search history.

(56) References Cited

U.S. PATENT DOCUMENTS

| 4,271,040 | A | * | 6/1981 | Khoobiar ....................... 502/211 |
| 4,444,907 | A | * | 4/1984 | Ohdan et al. ................... 502/211 |
| 5,422,326 | A | | 6/1995 | Kuroda et al. |
| 2007/0021296 | A1 | * | 1/2007 | Liang et al. .................... 502/208 |
| 2007/0021629 | A1 | * | 1/2007 | Stevenson et al. ............. 562/535 |
| 2007/0021630 | A1 | * | 1/2007 | Liang et al. .................... 562/535 |
| 2007/0167657 | A1 | * | 7/2007 | Kauffman et al. ............. 568/477 |

FOREIGN PATENT DOCUMENTS

| CN | 1270824 | | 8/2006 | |
| CN | 1874842 | | 12/2006 | |
| EP | 0 425 666 | * | 5/1991 | .............. C07C 27/14 |
| JP | 11-179209 | * | 7/1999 | .............. B01J 27/199 |
| KR | 10-0954049 | * | 12/2008 | .............. B01J 37/04 |
| WO | 2008/153341 | * | 12/2008 | .............. B01J 37/04 |

OTHER PUBLICATIONS

"Interaction between NOx and the Surface of Supported Heteropoly Compounds: In Situ IR Spectroscopic Data," V. A. Matyshak et al. Kinetics and Catalysis, 2011, vol. 52, No. 3, pp. 409-417.*

* cited by examiner

*Primary Examiner* — Patricia L Hailey
(74) *Attorney, Agent, or Firm* — Hamre, Schumann, Mueller & Larson, P.C.

(57) ABSTRACT

Disclosed are a catalyst and preparation method and use thereof. The catalyst has a constitution represented as the formula below, wherein, D represents at least one element selected from the group consisting of copper, magnesium, manganese, stibium and zinc; E represents at least one element selected from the group consisting of tungsten, silicon, nickel, palladium, ferrum and plumbum; Z is selected from the group consisting of SiC, $MoO_3$, $WO_3$, $TiO_2$ and $ZrO_2$; y/x=11.1-50:100; a=0.1-3; b=0.01-5; c=0.01-5; d=0.01-3; e=0.01-2; f is the proportion of oxygen atom balancing the valence. The method comprises: (i) formulating Solution A with molybdenum, phosphorus, and vanadium compounds; formulating Solution B with dissolve potassium compound and a D-containing compound; formulating Solution C with an E-containing compound; (ii) mix Solutions A, B and C under a temperature of −5-10° C.; (iii) pre-calcination (iv) adding graphite powder and the diluting heat-conductive agent, wherein the weight ratio between the diluting heat-conductive agent and the catalyst precursor (y/x) is 11.1-50%; and (v) calcination.

$x(Mo_{12}P_aK_bV_cD_dE_eO_f)/yZ$

13 Claims, No Drawings

HETEROPOLY ACID SALT CATALYST AND ITS PREPARATION METHOD

TECHNICAL FIELD

The present invention relates to a catalyst for synthesizing methacrylic acid (MAA) through the oxidation of methacrolein (MAL), which catalyst can be used in preparing methacrylic acid with high conversion and high selectivity under a relatively low reaction temperature. The present invention further relates to a method for preparing the catalyst and use of the catalyst in synthesizing methacrylic acid (MAA) through oxidation of methacrolein (MAL).

BACKGROUND ART

The most widely used method for preparing methacrylic acid in industry currently is the gas-phase oxidation of methacrolein with a heteropoly acid catalyst. In such method, the yield of methacrylic acid is mainly influenced by the performance of the heteropoly acid catalyst adopted, as most of the heteropoly acid catalysts contain phosphorus and molybdenum as principal components and have structures of heteropoly acid and/or salt, which are provided with low reactivity, low selectivity to methacrylic acid and short life. Therefore, great efforts have been made on the method for producing heteropoly acid catalysts, intending to improve the performance of the catalysts.

CN 1270824C has suggested to coat catalysts to increase the effective utilization of the active components of the catalyst, such that heat of reaction can be quickly removed by the increased thermal conductivity or the dilution effect from an inactive carrier, to enhance the selectivity of the catalyst. However, a catalyst with high mechanical strength is hard to obtain and the reaction temperature of which is too high to affect the life of the catalyst.

U.S. Pat. No. 5,422,326 has suggested to control the pore size distribution of the catalyst by adding organic macromolecular compounds with an average particle size of 0.01-10 μm during molding to enhance the selectivity of the catalyst. However, the reaction temperature of the catalyst is comparatively high and is not conducive for extending life of the catalyst.

CN 1874842A has suggested to obtain catalysts with enhanced performance by the following procedures: formulating a solution or slurry containing molybdenum, phosphorus and vanadium (Solution I); formulating a solution or slurry containing ammonium ions (Solution II); loading a tank (Tank A) with any one of the above solutions, Solution I or Solution II (Solution PR), and adding to a continuous liquid surface (0.01-10% area of the whole liquid surface of Solution PR loaded within Tank A) another solution (Solution LA) to formulate a mixed solution of Solution I and Solution II; drying and calcining to give the catalyst. However the catalyst also presents the disadvantage of high reaction temperature.

Therefore, there is still need to develop a catalyst with high activity and high selectivity under a relatively low reaction temperature in the reaction of synthesizing methacrylic acid (MAA) through oxidation of methacrolein (MAL).

SUMMARY

One object of the invention is to provide a catalyst suitable for synthesizing methacrylic acid (MAA) through oxidation of methacrolein (MAL), which catalyst is provided with high activity and high selectivity under a relatively low reaction temperature.

Another object of the invention is to provide a method for preparing the catalyst, wherein the catalyst prepared by the method of the invention can be used for preparing methacrylic acid with high conversion and high selectivity under a relatively low reaction temperature.

Therefore, one aspect of the invention is to provide a heteropoly acid salt catalyst having the following general formula:

$$x(Mo_{12}P_aK_bV_cD_dE_eO_f)/yZ$$

wherein,

D represents at least one element selected from the group consisting of copper (Cu), magnesium (Mg), manganese (Mn), stibium (Sb) and zinc (Zn);

E represents at least one element selected from the group consisting of tungsten (W), silicon (Si), nickel (Ni), palladium (Pd), ferrum (Fe) and plumbum (Pb);

Z is a carrier/diluting thermal-conductive agent, which is one selected from the group consisting of SiC, $MoO_3$, $WO_3$, $TiO_2$ and $ZrO_2$;

the weight ratio y/x=11.1-50:100;

a=0.1-3;

b=0.01-5;

c=0.01-5;

d=0.01-3;

e=0.01-2;

f is the atom ratio of oxygen balancing the valence for each component described above;

wherein, the catalyst is prepared by the following steps:

(i) according to the composition of the heteropoly acid salt catalyst, dissolving molybdenum, phosphorus, and vanadium compounds in a solvent to formulate Solution A; dissolving potassium compound and a D-containing compound in a solvent to formulate Solution B; and dissolving an E-containing compound in a solvent to formulate Solution C;

(ii) mixing Solutions A, B and C under a temperature of −5-10° C.;

(iii) pre-calcinating same under 150-300° C. for 60-600 minutes under an oxygen-containing gas flow to obtain a catalyst precursor;

(iv) adding to the pre-calcined catalyst precursor 1-5 wt % of graphite powder and a diluting thermal-conductive agent, wherein the weight ratio between the diluting thermal-conductive agent and the catalyst precursor (y/x) is 11.1-50%; and (v) calcinating under 300-450° C. in an oxygen-containing atmosphere for 60-600 minutes.

Another aspect of the invention relates to a method for preparing the heteropoly acid catalyst of the invention, wherein the method comprises the following steps:

(i) according to the composition of the heteropoly acid salt catalyst, dissolving molybdenum, phosphorus, and vanadium compounds in a solvent to formulate Solution A; dissolving potassium compound and a D-containing compound in a solvent to formulate Solution B; and dissolving an E-containing compound in a solvent to formulate Solution C;

(ii) mixing Solutions A, B and C under a temperature of −5-10° C.;

(iii) pre-calcinating same under 150-300° C. for 60-600 minutes under an oxygen-containing gas flow to obtain a catalyst precursor;

(iv) adding to the pre-calcined catalyst precursor 1-5 wt % of graphite powder and a diluting thermal-conductive agent, wherein the weight ratio between the diluting thermal-conductive agent and the catalyst precursor (y/x) is 11.1-50%; and (v) calcinating under 300-450° C. in an oxygen-containing atmosphere for 60-600 minutes.

Another aspect of the invention relates to use of the catalyst of the invention in the reaction of synthesizing methacrylic acid (MAA) through oxidation of methacrolein (MAL).

DETAILED DESCRIPTION

1. Heteropoly Acid Salt Catalyst

The invention provides a heteropoly acid salt catalyst having the following general formula:

$$x(Mo_{12}P_aK_bV_cD_dE_eO_f)/yZ$$

wherein, $Mo_{12}P_aK_bV_cD_dE_eO_f$ is referred to as a principal catalyst.

Z is carrier/diluting thermal-conductive agent, which can be one or more selected from the group consisting of SiC, $MoO_3$, $WO_3$, $TiO_2$, $ZrO_2$ and a mixture thereof.

Mo, P, K, V and O represent molybdenum, phosphorus, potassium, vanadium and oxygen atom respectively.

D represents at least one element selected from the group consisting of copper (Cu), magnesium (Mg), manganese (Mn), stibium (Sb) and zinc (Zn), preferably at least one element selected from the group consisting of copper (Cu), manganese (Mn) and zinc (Zn).

E represents at least one element selected from the group consisting of tungsten (W), silicon (Si), nickel (Ni), palladium (Pd), ferrum (Fe) and plumbum (Pb), preferably at least one element selected from the group consisting of tungsten (W), nickel (Ni), ferrum (Fe) and plumbum (Pb).

a, b, c, d, e and f represent the atom ratio of each element:

a=0.1-3, preferably 0.3-2.5, more preferably 0.5-2, optimally 0.8-1.8.

In a preferred embodiment of the invention, a is within a range defined by any two selected from 0.1, 3, 0.3, 2.5, 0.5, 2, 0.8 and 1.8 as end points.

b=0.01-5, preferably 0.05-4, more preferably 0.1-3, most preferably 0.5-2, optimally 0.8-1.8.

In an embodiment of the invention, b is within a range defined by any two selected from 0.01, 5, 0.05, 4, 0.1, 3, 0.5, 2, 0.8 and 1.8 as end points.

c=0.01-5, preferably 0.05-4.5, more preferably 0.1-4.0, even more preferably 0.5-3.5, most preferably 0.8-3.0, optimally 1.2-2.5.

In an embodiment of the invention, c is within a range defined by any two selected from 0.01, 5, 0.05, 4.5, 0.1, 4.0, 0.5, 3.5, 0.8, 3.0, 1.2 and 2.5 as end points.

d=0.01-3, preferably 0.05-2.8, even preferably 0.08-2.5, more preferably 0.1-2.0, most preferably 0.5-1.8, optimally 0.8-1.5.

In an embodiment of the invention, d is within a range defined by any two selected from 0.01, 3, 0.05, 2.8, 0.08, 2.5, 0.1, 2.0, 0.5, 1.8, 0.8 and 1.5 as end points.

e=0.01-2, preferably 0.05-1.8, more preferably 0.08-1.5, most preferably 0.1-1.2, optimally 0.5-1.0.

In an embodiment of the invention, e is within a range defined by any two selected from 0.01, 2, 0.05, 1.8, 0.08, 1.5, 0.1, 1.2, 0.5 and 1.0 as end points.

f is the atom ratio of oxygen balancing the valence for each component described above.

x, y represent the amounts of the principal catalyst and the carrier/diluting thermal-conductive agent Z respectively, wherein the weight ratio y/x is 11.1-50:100, more preferably 15-45:100, more preferably 20-40:100, optimally 25-35:100.

In a preferred embodiment of the invention, based on 100 parts by weight of the principal catalyst, the amount of the carrier/diluting thermal-conductive agent is within a range defined by any two selected from 11.1, 50, 15, 45, 20, 40, 25 and 35 as end points.

2. Method for Preparing the Heteropoly Acid Salt Catalyst of the Invention

It was found by the inventor that, if low temperature mixing is adopted in preparing the above described catalyst, the catalyst obtained will have improved conversion of methacrolein, selectivity to methacrylic acid and yield of the methacrylic acid, and the invention was accomplished on the base of such finding.

Therefore, the catalyst of the invention is prepared by the following process: dissolving compounds of corresponding desired elements to formulate Solution A, Solution B and Solution C, respectively; mixing the three solutions under a temperature of −5-10° C. to produce a dispersed slurry comprising the catalyst precursor of all components of the catalyst described above; drying; pre-calcinating the dried catalyst precursor, adding a diluting thermal-conductive agent, molding, and calcinating to obtain the final product.

In particular, the preparation method of the invention comprises the following steps:

(i) according to the composition of the heteropoly acid salt catalyst, dissolving molybdenum, phosphorus, and vanadium compounds in a solvent to formulate Solution A; dissolving potassium compound and a D-containing compound in a solvent to formulate Solution B; and dissolving an E-containing compound in a solvent to formulate Solution C.

Solution A is formulated by dissolving at least molybdenum, phosphorus, and vanadium compounds in a solvent. Besides molybdenum, phosphorus and vanadium atom, Solution A can further contain oxygen atom and ammonium ions. As raw materials for formulating Solution A, the molybdenum-containing compound includes molybdenum trioxide, ammonium paramolybdate, molybdophosphoric aicd or molybdates and the like, preferably ammonium paramolybdate; the phosphorus-containing compound includes phosphorus pentoxide, phosphoric acid, molybdophosphoric aicd, ammonium phosphate and the like, preferably phosphoric acid; and the vanadium-containing compound includes vanadium pentoxide, ammonium metavanadate and the like, preferably ammonium metavanadate.

There is no specific requirement on the desired solvent and the temperature for dissolving the materials, provided that the compounds used can be completely dissolved or homogeneously mixed. The solvent can be, for example, water, ethanol and the like, preferably water. Based on 100 parts by weight of the total compounds for preparing the slurry, the water amount is about 100-300 parts by weight, preferably 100-150 parts by weight.

Solution B is formulated by dissolving at least potassium compound and D-containing compound in a solvent, wherein the compound can be nitrates, acetates, chlorides or oxides. There is no specific requirement on the desired solvent and the temperature for dissolving the materials, provided that the compounds used can be completely dissolved or homogeneously mixed. The solvent can be, for example water, ethanol and the like, preferably water. Based on 100 parts by weight of the total compounds for preparing the slurry, the water amount is about 200-800 parts by weight, preferably 300-400 parts by weight.

Solution C is formulated by dissolving at least E-containing compound in a solvent, wherein the compound can be nitrates, acetates, chlorides or oxides. There is no specific requirement on the desired solvent and the temperature for dissolving the materials, provided that the compounds used can be completely dissolved or homogeneously mixed. The solvent can be, for example, water, ethanol and the like, preferably water. Based on 100 parts by weight of the total compounds for preparing the slurry, the water amount is about 100-800 parts by weight, preferably 200-300 parts by weight.

Using a molybdenum atom proportion of 12 as a benchmark, the proportions of each active component in the catalyst of the invention are as follows: the proportion of phosphorus is 0.1-3, preferably 0.5-2.5, more preferably 1.0-2.3; the proportion of potassium is 0.01-5, more preferably 0.1-4, most preferably 0.5-3; the proportion of vanadium is 0.01-5, more preferably 0.02-4.5, most preferably 0.1-4. According to the conditions and the like for using the catalyst, the types and proportions of other active components desired are determined to obtain the catalyst with the most suitable performance. Generally, the proportion of element D is 0.01-3, preferably 0.05-2.5, most preferably 0.1-1.5; the proportion of element E is 0.01-2, more preferably 0.1-1.8, most preferably 0.5-1.2.

(ii) mixing Solutions A, B and C under −5-10° C.

During preparing the slurry, Solution A, Solution B and Solution C need to be mixed under −5-10° C. to obtain a catalyst with high activity. The preferred temperature for mixing Solution A, Solution B and Solution C is −4-8° C., more preferably −3-6° C., most preferably 0-4° C. In a preferred embodiment of the invention, the mixing temperature is within a range defined by any two selected from −5° C., 10° C., −4° C., 8° C., −3° C., 6° C., 0° C. and 4° C. as end points.

There is no specific requirement on the order of mixing materials, with the following ways adoptable: mixing Solution A and Solution B to give a mixed solution A+B before mixing with Solution C; mixing Solution B and Solution C to give a mixed solution B+C before mixing with Solution A, and any ways similarly. A preferred way is mixing Solution A and Solution B to obtain a mixed solution A+B before mixing with Solution C. The mixing is generally performed with agitation simultaneously to obtain uniform suspended slurry.

Next, the above obtained slurry is dried. There is no specific requirement on the method and temperature for drying, and spray drying, evaporation drying, drum drying and so forth can be chosen, preferably spray drying.

(iii) pre-calcinating under 150-300° C. for 60-600 minutes under an oxygen-containing gas flow to obtain a catalyst precursor After the dried catalyst precursor is grinded as need, the material is subjected to pre-calcination under oxygen-containing gas (for example, air) flow at 150-300° C., preferably 200-250° C. The pre-calcination lasts for 60-600 minutes, preferably 120-300 minutes.

(iv) adding to the pre-calcined catalyst precursor 1-5 wt % of graphite powder and a diluting thermal-conductive agent, wherein the weight ratio between the diluting thermal-conductive agent and the catalyst precursor (y/x) is 11.1-50%

The method of the invention includes: adding 1-5 wt % of graphite powder and the diluting thermal-conductive agent into the pre-calcined catalyst precursor, mixing homogeneously and molding, calcinating again to obtain the final product of the catalyst. The diluting thermal-conductive agent can be one selected from the group consisting of SiC, $MoO_3$, $WO_3$, $TiO_2$ and $ZrO_2$, preferably one or more selected from the group consisting of SiC, $MoO_3$ or $ZrO_2$ and a mixture thereof.

The masses of the principal catalyst prepared and the carrier/diluting thermal-conductive agent Z are represented by x, y respectively, wherein the weight ratio y/x between them is 11.1-50:100, preferably 15-45:100, more preferably 20-40:100, optimally 25-35:100.

In a preferred embodiment of the invention, based on 100 parts by weight of the principal catalyst, the amount of the carrier/diluting thermal-conductive agent is within a range defined by any two selected from 11.1, 50, 15, 45, 20, 40, 25 and 35 as end points.

There is no specific requirement on the way of molding the catalyst, and dry or wet molding known in the art can be used, for example, compression molding, extrusion molding, granulation molding and the like. There is also no specific requirement of the shape of the final product, and cylinder, circline, sphere and so on can be chosen as the desired shape. Furthermore, small amount of lubricant, such as graphite and the like, can be added while molding.

(v) calcinating under 300-450° C. in an oxygen-containing atmosphere for 60-600 minutes.

The calcination of the catalyst is need to be carried out under an atmosphere containing oxygen, the calcinating temperature can be chosen at 300-450° C., preferably 320-420° C., most preferably 350-400° C. The calcination can last for 60-600 minutes, preferably 120-540 minutes, more preferably 240-480 minutes. For the atmosphere containing oxygen, the mass concentration of oxygen is no less than 10%, preferably no less than 20%.

3. Use of the Catalyst of the Invention

The catalyst prepared by the above described method can be used for synthesizing MAA through gas-phase oxidation of MAL. In an embodiment of the invention, the gas-phase oxidation reaction comprises the following steps: pre-heating a mixture of the raw material MAL, air or a diluting gas containing molecular oxygen and vapor, and passing same into a tubular fixed bed reactor loaded with the catalyst for synthesizing MAA through selective oxidation. The molecular oxygen contained in the mixture of the diluting gas can be derived from pure oxygen, oxygen-rich gas or air, and the diluting gas can be one or a mixture at any ratio of $N_2$, CO, $CO_2$ or $H_2O$.

The condition of the oxidation is: temperature: 220-300° C., preferably 240-280° C.; pressure: 0.05-0.5 MPa, preferably atmospheric pressure; total reaction space velocity for the mixed gas of reaction raw materials: 1000-5000 $h^{-1}$, preferably 1200-3000 $h^{-1}$; molar concentration of MAL: 1-20%, preferably 3-8%; molar ratio between $O_2$ and MAL: 0.5-8, preferably 1-5; molar ratio between vapor and MAL: 1-15, preferably 3-10.

Next, the preparation method of the catalyst with good performance and the reactivity of the catalyst in producing MAA through selectively catalyzing oxidation of MAL are further described by way of examples, none of which are intended to limit the scope of the invention.

EXAMPLES

In the examples below, the conversion and selectivity in synthesizing MAA through oxidation of MAL can be calculated by the following formulas.

Conversion of methacrolein (%)=[(methacrolein amount before reaction−methacrolein amount after reaction)/methacrolein amount before reaction]×100%

Selectivity to methacrylic acid (%)=(methacrylic acid amount generated in reaction/methacrolein amount reacted)×100%

Example 1

1. Preparation of Catalyst

In 400 g of distilled water were dissolved 300 g of ammonium paramolybdate, 9.9 g of ammonium metavanadate and 24.2 g of phosphoric acid to formulate Solution A; in 100 g of distilled water were dissolved 28.5 g of potassium nitrate and 10.4 g of copper nitrate to formulate Solution B; and in 5 g of distilled water was dissolved 2.9 g of ferric nitrate to formulate Solution C.

Solution A was cooled to 4° C. To solution A was mixed Solution B under stirring condition for 10 minutes. After stirring for another 10 minutes, Solution C was added into the mixed solution AB to obtain a mixture slurry ABC. Stirring was continued under 4° C. for 120 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 15 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $85(Mo_{12}P_{1.5}K_2V_{0.6}Cu_{0.3}Fe_{0.05})/15SiC$.

2. Evaluation of the Catalyst Performance 20 g of catalyst particles of 10-20 meshes were loaded into a tubular fixed bed reactor for selective oxidation under the condition of 250° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Comparison Example 1

1. Preparation of Catalyst 300 g of ammonium paramolybdate, 9.9 g of ammonium metavanadate and 24.2 g of phosphoric acid were dissolved in 400 g of distilled water to formulate Solution A; 28.5 g of potassium nitrate and 10.4 g of copper nitrate were dissolved in 100 g of distilled water to formulate Solution B; and 2.9 g of ferric nitrate was dissolved in 5 g of distilled water to formulate Solution C.

Solution A was maintained under 30° C. To solution A was mixed Solution B under stirring condition for 10 minutes. After stirring for another 10 minutes, Solution C was added into the mixed solution AB to obtain a mixture slurry ABC. Stirring was continued under 30° C. for 120 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 15 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $85(Mo_{12}P_{1.5}K_2V_{0.6}Cu_{0.3}Fe_{0.05})/15SiC$.

2. Evaluation of the Catalyst Performance 20 g of catalyst particles of 10-20 meshes were loaded into a tubular fixed bed reactor for selective oxidation under the condition of 270° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Comparison Example 2

1. Preparation of Catalyst 300 g of ammonium paramolybdate, 9.9 g of ammonium metavanadate and 24.2 g of phosphoric acid were dissolved in 400 g of distilled water to formulate Solution A; 28.5 g of potassium nitrate and 10.4 g of copper nitrate were dissolved in 100 g of distilled water to formulate Solution B; and 2.9 g of ferric nitrate was dissolved in 5 g of distilled water to formulate Solution C.

Solution A was maintained under 90° C. To solution A was mixed Solution B under stirring condition for 10 minutes. After stirring for another 10 minutes, Solution C was added into the mixed solution AB to obtain a mixture slurry ABC. Stirring was continued under 90° C. for 120 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 15 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $85(Mo_{12}P_{1.5}K_2V_{0.6}Cu_{0.3}Fe_{0.05})/15SiC$.

2. Evaluation of the Catalyst Performance 20 g of catalyst particles of 10-20 meshes were loaded into a tubular fixed bed reactor for selective oxidation under the condition of 285° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Example 2

1. Preparation of Catalyst 300 g of ammonium paramolybdate, 9.9 g of ammonium metavanadate and 24.2 g of phosphoric acid were dissolved in 400 g of distilled water to formulate Solution A; 28.5 g of potassium nitrate and 10.4 g of copper nitrate were dissolved in 100 g of distilled water to formulate Solution B; and 2.9 g of ferric nitrate was dissolved in 5 g of distilled water to formulate Solution C.

Solution A was cooled to 4° C. To solution A was mixed Solution B under stirring condition for 10 minutes. After stirring for another 10 minutes, Solution C was added into the mixed solution AB to obtain a mixture slurry ABC. Stirring was continued under 4° C. for 300 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 15 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The constitution of the catalyst was $85(Mo_{12}P_{1.51}K_2V_{0.06}Cu_{0.3}Fe_{0.05})/15SiC$.

2. Evaluation of the Catalyst Performance 20 g of catalyst particles of 10-20 meshes were loaded into a tubular fixed bed reactor for selective oxidation under the condition of 250° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Example 3

1. Preparation of Catalyst 300 g of ammonium paramolybdate, 9.9 g of ammonium metavanadate and 24.2 g of phosphoric acid were dissolved in 400 g of distilled water to formulate Solution A; 28.5 g of potassium nitrate and 6.9 g of copper nitrate were dissolved in 100 g of distilled water to formulate Solution B; and 4.2 g of nickel nitrate was dissolved in 15 g of distilled water to formulate Solution C.

Solution A was cooled to 2° C. To solution A was mixed Solution B under stirring condition for 10 minutes. After stirring for another 10 minutes, Solution C was added into the mixed solution AB to obtain a mixture slurry ABC. Stirring was continued under 2° C. for 300 minutes to obtain a slurry containing the catalyst precursor.

The slurry was dried under 150° C. for 24 hours to give a solid powder. After calcination under 250° C. in air atmosphere for 3 hours, 85 g of the solid powder was taken and mixed homogeneously with 15 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $85(Mo_{12}P_{1.5}K_2V_{0.6}Cu_{0.2}Ni_{0.1})/15SiC$.

2. Evaluation of the Catalyst Performance 20 g of catalyst particles of 10-20 meshes were loaded into a tubular fixed bed reactor for selective oxidation under the condition of 255° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Comparison Example 3

1. Preparation of Catalyst 300 g of ammonium paramolybdate, 9.9 g of ammonium metavanadate and 24.2 g of phosphoric acid were dissolved in 400 g of distilled water to formulate Solution A; 28.5 g of potassium nitrate and 6.9 g of copper nitrate were dissolved to formulate Solution B in 100 g of distilled water; and 4.2 g of nickel nitrate was dissolved in 15 g of distilled water to formulate Solution C.

Solution A was cooled to 2° C. To solution A was mixed Solution B under stirring condition for 10 minutes. After stirring for another 10 minutes, Solution C was added into the mixed solution AB to obtain a mixture slurry ABC. Stirring was continued under 2° C. for 300 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 9.4 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $90(Mo_{12}P_{1.5}K_2V_{0.6}Cu_{0.2}Ni_{0.1})/10SiC$.

2. Evaluation of the Catalyst Performance 20 g of catalyst particles of 10-20 meshes were loaded into a tubular fixed bed reactor for selective oxidation under the condition of 270° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Example 4

1. Preparation of Catalyst 300 g of ammonium paramolybdate, 9.9 g of ammonium metavanadate and 24.2 g of phosphoric acid were dissolved in 400 g of distilled water to formulate Solution A; 28.5 g of potassium nitrate and 21.5 g of manganese nitrate were dissolved in 150 g of distilled water to formulate Solution B; and 2.9 g of ferric nitrate was dissolved in 5 g of distilled water to formulate Solution C.

Solution A was cooled to 4° C. To solution A was mixed Solution B under stirring condition for 10 minutes. After stirring for another 10 minutes, Solution C was added into the mixed solution AB to obtain a mixture slurry ABC. Stirring was continued under 4° C. for 120 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 28.3 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $75(Mo_{12}P_{1.5}K_2V_{0.6}Mn_{0.4}Fe_{0.05})/25SiC$.

2. Evaluation of the Catalyst Performance 20 g of catalyst particles of 10-20 meshes were loaded into a tubular fixed bed reactor for selective oxidation under the condition of 260° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Comparison Example 4

1. Preparation of Catalyst 300 g of ammonium paramolybdate, 9.9 g of ammonium metavanadate and 24.2 g of phosphoric acid were dissolved in 400 g of distilled water to formulate Solution A; 28.5 g of potassium nitrate and 21.5 g of manganese nitrate were dissolved in 150 g of distilled water to formulate Solution B; and 2.9 g of ferric nitrate was dissolved in 5 g of distilled water to formulate Solution C.

Solution A was maintained under 90° C. To solution A was mixed Solution B under stirring condition for 10 minutes. After stirring for another 10 minutes, Solution C was added into the mixed solution AB to obtain a mixture slurry ABC. Stirring was continued under 90° C. for 120 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 28.3 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $75(Mo_{12}P_{1.5}K_2V_{0.6}Mn_{0.4}Fe_{0.05})/25SiC$.

2. Evaluation of the Catalyst Performance 20 g of catalyst particles of 10-20 meshes were loaded into a multitubular fixed bed reactor for selective oxidation under the condition of 285° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

Example 5

1. Preparation of Catalyst 300 g of ammonium paramolybdate, 6.6 g of ammonium metavanadate and 24.2 g of phosphoric acid were dissolved in 400 g of distilled water to formulate Solution A; 28.5 g of potassium nitrate and 10.4 g of copper nitrate were dissolved in 100 g of distilled water to formulate Solution B; and 2.9 g of ferric nitrate was dissolved in 5 g of distilled water to formulate Solution C.

Solution A was cooled to 4° C. To solution A was mixed Solution B under stirring condition for 10 minutes. After stirring for another 10 minutes, Solution C was added into the mixed solution AB to obtain a mixture slurry ABC. Stirring was continued under 4° C. for 120 minutes to obtain a slurry containing the catalyst precursor.

The slurry was dried under 150° C. for 24 hours to give a solid powder. After calcination under 250° C. in atmosphere for 3 hours, 85 g of the solid powder was taken and mixed homogeneously with 15 g of silicon carbide before adding 2 g of graphite and a proper amount of distilled water. Extrusion molding was performed and particles of 10-20 meshes were produced before calcining under 380° C. for 5 hours with air flow to give the final product of the catalyst. The composition of the catalyst was $85(Mo_{12}P_{1.5}K_2V_{0.4}Cu_{0.3}Fe_{0.05})/15SiC$.

2. Evaluation of the Catalyst Performance 20 g of catalyst particles of 10-20 mesh were loaded into a tubular fixed bed reactor for selective oxidation under the condition of 250° C., atmospheric pressure, $MAL:O_2:N_2:H_2O=1:2:8:10$, reaction space velocity $1250\,h^{-1}$. The reaction product was taken and analyzed with gas phase chromatography after 80 hours of reaction. The results are listed in Table 1.

TABLE 1

| | Reaction temperature/° C. | Conversion of MAL/% | Selectivity to MAA/% | MAA yield/% |
|---|---|---|---|---|
| Example 1 | 250 | 82.4 | 83.8 | 69.1 |
| Com. Ex. 1 | 270 | 81.9 | 81.6 | 66.8 |
| Com. Ex. 2 | 285 | 78.5 | 82.1 | 64.4 |
| Example 2 | 250 | 83.1 | 85.4 | 71.0 |
| Example 3 | 255 | 85.2 | 84.3 | 71.8 |
| Com. Ex. 3 | 270 | 84.4 | 84.1 | 71.0 |
| Example 4 | 260 | 82.6 | 83.9 | 69.3 |
| Com. Ex. 4 | 285 | 79.6 | 82.3 | 65.5 |
| Example 5 | 250 | 83.5 | 85.1 | 71.1 |

What is claimed is:

1. A heteropoly acid salt catalyst having the following general formula:

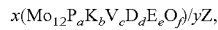

$$x(Mo_{12}P_aK_bV_cD_dE_eO_f)/yZ,$$

wherein
D represents at least one element selected from the group consisting of copper, magnesium, manganese, stibium and zinc;
E represents at least one element selected from the group consisting of tungsten, silicon, nickel, palladium, ferrum and plumbum;
Z is a carrier/diluting thermal-conductive agent, which is one selected from the group consisting of SiC, $MoO_3$, $WO_3$, $TiO_2$ and $ZrO_2$;
the weight ratio $y/x=15-50:100$;
$a=0.1-3$;
$b=0.01-5$;
$c=0.01-5$;
$d=0.01-3$;
$e=0.01-2$; and
f is the atom ratio of oxygen balancing the valence for each component described above,
wherein the catalyst is prepared by the following procedures:
(i) dissolving molybdenum, phosphorus, and vanadium compounds in a solvent to formulate Solution A; dissolving potassium compound and a D-containing compound in a solvent to formulate Solution B; and dissolving an E-containing compound in a solvent to formulate Solution C;
(ii) mixing Solutions A, B and C under a temperature of −5-10° C.;
(iii) pre-calcinating under an oxygen-containing gas flow to obtain a catalyst precursor;
(iv) adding into the catalyst precursor 1-5 wt % of graphite powder and a diluting thermal-conductive agent, wherein the weight ratio between the diluting thermal-conductive agent and the catalyst precursor (y/x) is 15-50:100; and
(v) calcinating in an oxygen-containing atmosphere.

2. The heteropoly acid salt catalyst of claim 1, wherein the calcinating of step (v) is carried out in an oxygen-containing atmosphere under 300-450° C. for 60-600 minutes.

3. The heteropoly acid salt catalyst of claim 1, wherein the pre-calcinating of step (iii) is carried out under oxygen-containing gas flow under 150-300° C. for 60-600 minutes.

4. The heteropoly acid salt catalyst of claim 1, wherein the temperature of step (ii) is −4-8° C.

5. The heteropoly acid salt catalyst of claim 4, wherein the temperature is −3-6° C.

6. The heteropoly acid salt catalyst of claim 5, wherein the temperature is 0-4° C.

7. The heteropoly acid salt catalyst of claim 1, wherein
a is 0.3-2.5;
b is 0.05-4;
c is 0.05-4.5;
d is 0.05-2.8; and
e is 0.05-1.8.

8. The heteropoly acid salt catalyst of claim 1, wherein the weight ratio y/x is 20-40:100.

9. A method for preparing the heteropoly salt catalyst of claim 1, comprising the following steps:
(i) dissolving molybdenum, phosphorus, and vanadium compounds in a solvent to formulate Solution A; dissolving potassium compound and a D-containing compound in a solvent to formulate Solution B; and dissolving an E-containing compound in a solvent to formulate Solution C;
(ii) mixing Solutions A, B and C under a temperature of −5-10° C.;
(iii) pre-calcinating under an oxygen-containing gas flow to obtain a catalyst precursor;
(iv) adding to the catalyst precursor 1-5 wt % of graphite powder and a diluting thermal-conductive agent, wherein the weight ratio between the diluting thermal-conductive agent and the catalyst precursor (y/x) is 15-50:100; and
(v) calcinating in an oxygen-containing atmosphere.

10. The method of claim 9, wherein the calcinating in step (v) is carried out in the oxygen-containing atmosphere under 300-450° C. for 60-600 minutes; and the pre-calcinating in step (iii) is carried out with the oxygen-containing gas flow under 150-300° C. for 60-600 minutes.

11. The method of claim 9, wherein the temperature in step (ii) is −4-8° C.

12. The method of claim 11, wherein the temperature in step (ii) is −3-6° C.

13. The method of claim 12, wherein the temperature in step (ii) is 0-4° C.

* * * * *